United States Patent
Lee et al.

(10) Patent No.: US 8,031,718 B2
(45) Date of Patent: Oct. 4, 2011

(54) METHOD OF DATA COMMUNICATION BETWEEN PLC STATIONS BELONGING TO DIFFERENT PLC CELLS AND APPARATUS THEREOF

(75) Inventors: Ju-han Lee, Suwon-si (KR); In-hwan Kim, Suwon-si (KR); Seung-gi Chang, Seoul (KR); Joon-hee Lee, Gunpo-si (KR); Jun-hae Choi, Seongnam-si (KR); Ho-jeong You, Suwon-si (KR); Ji-hoon Kim, Hwaseong-si (KR); Joon-hyuk Ryu, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1140 days.

(21) Appl. No.: 11/541,528

(22) Filed: Oct. 3, 2006

(65) Prior Publication Data

US 2007/0189302 A1    Aug. 16, 2007

(30) Foreign Application Priority Data

Feb. 16, 2006    (KR) .................. 10-2006-0015156

(51) Int. Cl.
H04L 12/28    (2006.01)
(52) U.S. Cl. .................. 370/395.2; 370/395.3; 370/401; 455/402; 340/310.11; 713/151; 713/171; 726/27; 307/1; 307/112
(58) Field of Classification Search .................. 370/485, 370/486, 487, 395.2, 395.3, 395.31, 395.32, 370/395.52, 395.53, 401; 340/310.11; 455/402; 713/151, 171; 726/26, 27, 28, 29, 30, 31, 32, 33
See application file for complete search history.

(56) References Cited

U.S. PATENT DOCUMENTS 5,754,547 A * 5/1998 Nakazawa .................. 370/401
(Continued)

FOREIGN PATENT DOCUMENTS

EP    1 076 444 A1    2/2001
(Continued)

OTHER PUBLICATIONS

PCT International Search Report dated Mar. 28, 2007 issued in PCT/KR2006/005552.
(Continued)

Primary Examiner — Marsha D Banks Harold
Assistant Examiner — Bo Hui A Zhu
(74) Attorney, Agent, or Firm — Stanzione & Kim, LLP

(57) ABSTRACT

A method of data communication between power line communication (PLC) stations belonging to different PLC cells includes transmitting a station ID of a PLC reception station to a PLC cell bridge (CB) of a first PLC cell to which a PLC transmission station belongs, receiving a group identification (GID) and an encryption key of a second PLC cell to which the PLC reception station belongs from the PLC CB of the first PLC cell, encrypting data to be transmitted using the encryption key of the second PLC cell, and transmitting the station ID of the PLC reception station, the GID of the second PLC cell, and the encrypted data, to the PLC CB of the first PLC cell, and an apparatus to perform the method.

21 Claims, 3 Drawing Sheets

U.S. PATENT DOCUMENTS

| | | | |
|---|---|---|---|
| 5,852,630 A * | 12/1998 | Langberg et al. | 375/219 |
| 7,206,299 B2 * | 4/2007 | Matsugatani et al. | 370/331 |
| 2001/0023487 A1 * | 9/2001 | Kawamoto | 713/202 |
| 2002/0131446 A1 * | 9/2002 | Metcalf, III | 370/465 |
| 2003/0055923 A1 | 3/2003 | Kim et al. | |
| 2004/0064699 A1 | 4/2004 | Hooker et al. | |
| 2004/0160990 A1 * | 8/2004 | Logvinov et al. | 370/509 |
| 2004/0223617 A1 | 11/2004 | Corcoran et al. | |
| 2005/0013307 A1 * | 1/2005 | Park | 370/395.53 |
| 2005/0017846 A1 | 1/2005 | Butler et al. | |

FOREIGN PATENT DOCUMENTS

| | | |
|---|---|---|
| JP | 2004-336642 | 11/2004 |
| KR | 2003-0097011 | 12/2003 |
| KR | 2005-117246 | 12/2005 |
| WO | 01/95557 | 12/2001 |

OTHER PUBLICATIONS

European Search Report dated Jul. 13, 2009 issued in EP Application No. 06835267.3.

* cited by examiner

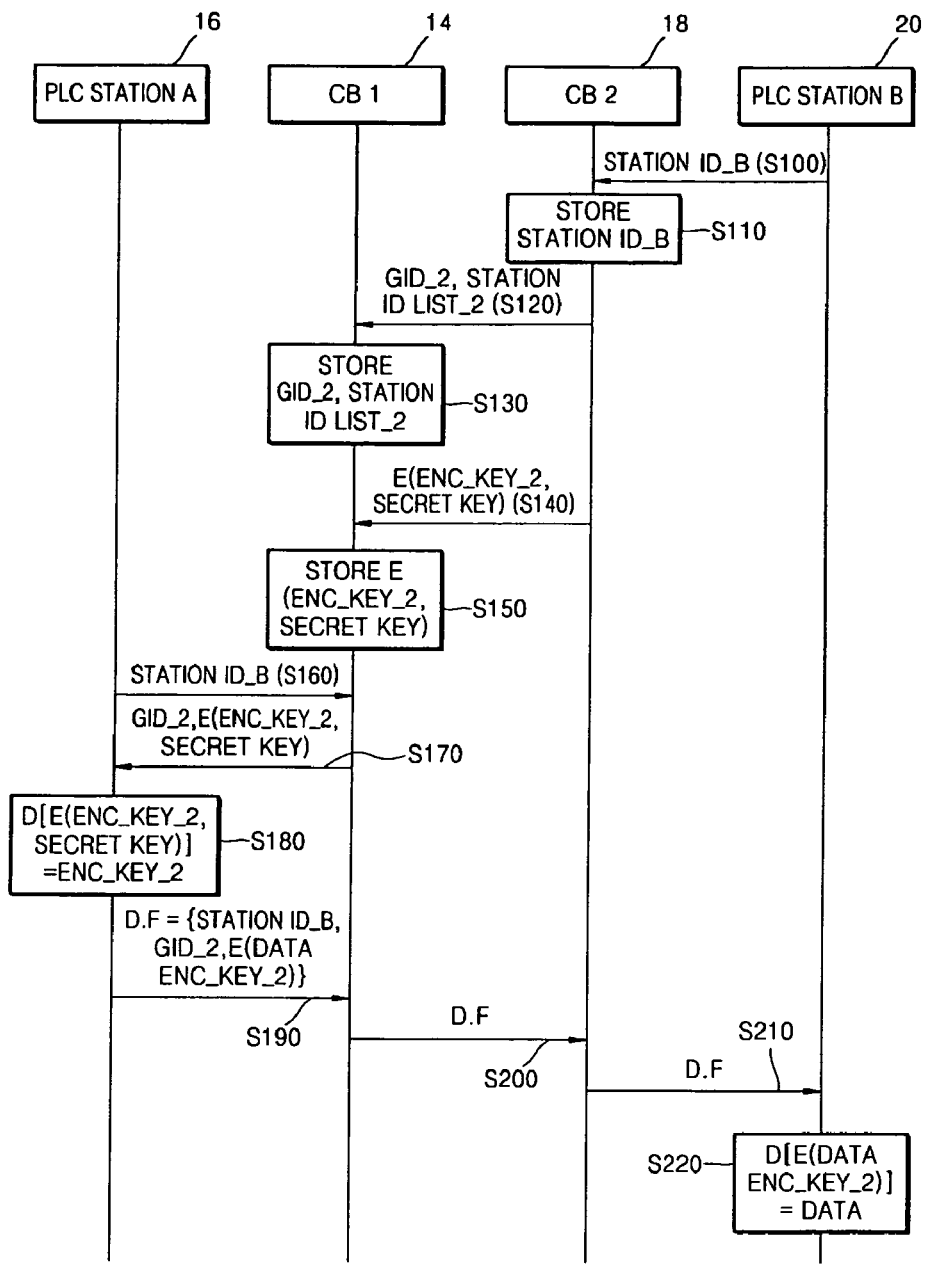

METHOD OF DATA COMMUNICATION BETWEEN PLC STATIONS BELONGING TO DIFFERENT PLC CELLS AND APPARATUS THEREOF

CROSS-REFERENCE TO RELATED APPLICATIONS

This application claims priority under 35 U.S.C. §119(a) from Korean Patent Application No. 10-2006-0015156, filed on Feb. 16, 2006, in the Korean Intellectual Property Office, the disclosure of which is incorporated herein in its entirety by reference.

BACKGROUND OF THE INVENTION

1. Field of the Invention

The present general inventive concept relates to a power line communication (PLC) system, and more particularly, to a data communication system between different PLC cells and method thereof.

2. Description of the Related Art

A power line communication (PLC) method is one of a plurality of methods used to build a communication network for a home network. PLC technology uses existing power lines in houses. Accordingly, unlike Ethernet networks, PLC networks do not need additional wiring work, and can be used in basements or shaded areas that wireless networks cannot reach.

In PLC technology, a cell bridge (CB) that connects two cells is used. The CB enables communication between two cells. The CB should recognize a group identification (GID) and encryption key of each of two cells to be linked. However, in a conventional data communication method using PLC technology, an administrator must manually input the GID and encryption key of each of the cells in the CB. Since this conventional method is inconvenient, a new mechanism to automate this process is desirable.

SUMMARY OF THE INVENTION

The present general inventive concept provides a method and apparatus of data communication to enable a cell bridge to actively manage information on cells in data communication between different PLC cells.

The present general inventive concept also provides a computer readable recording medium having embodied thereon a computer program to execute the data communication method.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing a power line communication data transmission method to transmit data from a PLC transmission station of a first cell to a PLC reception station of a second cell, the method including transmitting a station ID of the PLC reception station to a cell bridge of the first cell, receiving a group identification and an encryption key of the second cell from the cell bridge of the first cell, encrypting data to be transmitted to the second cell using the encryption key of the second cell, and transmitting the station ID of the PLC reception station, the group identification of the second cell, and the encrypted data to the cell bridge of the first cell.

The foregoing and/or other aspects and utilities of the present general inventive concept may also be achieved by providing a method of transmitting data from a first cell bridge of a first power line communication cell, the method including receiving a station ID of a PLC reception station belonging to a second power line communication cell from a PLC transmission station of the first cell including the first cell bridge, transmitting a group identification and an encryption key of the second cell to the PLC transmission station of the first cell, receiving the station ID of the PLC reception station, the group identification of the second cell, and data encrypted using the encryption key of the second cell from the PLC transmission station, and transmitting the station ID of the PLC reception station, the group identification of the second cell, and the encrypted data to a second cell bridge of the second cell.

The foregoing and/or other aspects and utilities of the present general inventive concept may also be achieved by providing a power line communication data transmission apparatus to transmit data from a PLC transmission station of a first cell to a PLC reception station of a second cell, the apparatus including a reception station ID transmission unit to transmit a station ID of the PLC reception station to a cell bridge of the first cell including the PLC transmission station, a reception cell information reception unit to receive a group identification and an encryption key of the second cell from the cell bridge of the first cell, a data encryption unit to encrypt data to be transmitted to the second cell using the encryption key of the second cell, and a data transmission unit to transmit the station ID of the PLC reception station, the group identification of the second cell, and the encrypted data to the cell bridge of the first cell.

The foregoing and/or other aspects and utilities of the present general inventive concept may also be achieved by providing an apparatus to transmit data from a first power line communication cell bridge, the apparatus including a reception station ID reception unit to receive a station ID of a PLC reception station belonging to a second power line communication cell from a PLC transmission station of a first power line communication cell including the first cell bridge, a reception cell information transmission unit to transmit a group identification and an encryption key of the second cell to the PLC transmission station, a data reception unit to receive the station ID of the PLC reception station, the group identification of the second cell, and data encrypted using the encryption key of the second cell from the PLC transmission station, and a data transmission unit to transmit the station ID of the PLC reception station, the group identification of the second cell, and the encrypted data to a second power line communication cell bridge of the second cell.

The foregoing and/or other aspects and utilities of the present general inventive concept may be achieved by providing a power line communication transmission cell, including a PLC station including data to be transmitted to an external cell, and a cell bridge to automatically advertise a group identification, an encrypted key, and a list of stations of the power line communication transmission cell, to automatically receive and store a group identification, an encrypted key, and a list of stations of the external cell, and to automatically transmit the data from the PLC station to the external cell.

The foregoing and/or other aspects and utilities of the present general inventive concept may be achieved by providing a power line communication transmission system, including a first cell comprising a first cell bridge to automatically advertise a first group identification and a first list of stations of the first cell to cells external to the first cell, and to encrypt and automatically advertise a first encryption key of the first cell to the cells external to the first cell, and a second cell comprising a second cell bridge to automatically advertise a second group identification and a second list of stations of the second cell to cells external to the second cell, and to encrypt and automatically advertise a second encryption key of the second cell to the cells external to the second cell, in which the first cell bridge automatically receives and stores the second group identification, the second list of stations, and the encrypted second encryption key of the second cell advertised by the second cell bridge, and the second cell bridge automatically receives and stores the first group identification, the first list of stations, and the encrypted first encryption key of the first cell advertised by the first cell bridge. The first cell may include a PLC receiving station to automatically receive data transmitted from the second cell using the first cell bridge, and the second cell may include a PLC transmitting station including the data to automatically transmit the data to the PLC receiving station using the first and second cell bridges.

The foregoing and/or other aspects and utilities of the present general inventive concept may be achieved by providing a method to automatically communicate between cells of a power line communication transmission system including a first cell having a first cell bridge and a first PLC station and a second cell having a second cell bridge and a second PLC station, the method including transmitting a medium access control protocol data unit frame including a station ID of the second PLC station from the first PLC station to the first cell bridge, transmitting a group identification and an encryption key of the second cell from the first cell bridge to the first PLC station, transmitting a medium access control protocol data unit data frame including the station ID of the second PLC station, the group identification of the second cell, and data encrypted with the encryption key of the second cell from the first PLC station to the first cell bridge, transmitting the received medium access control protocol data unit data frame from the first cell bridge through the second cell bridge to the second PLC station, and decrypting the encrypted data received at the second PLC station using the encryption key of the second cell to obtain the data transmitted by the first PLC station.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 3 illustrates a data transmission method, according to an embodiment of the present general inventive concept.

DETAILED DESCRIPTION OF THE PREFERRED EMBODIMENTS

Figure 1:
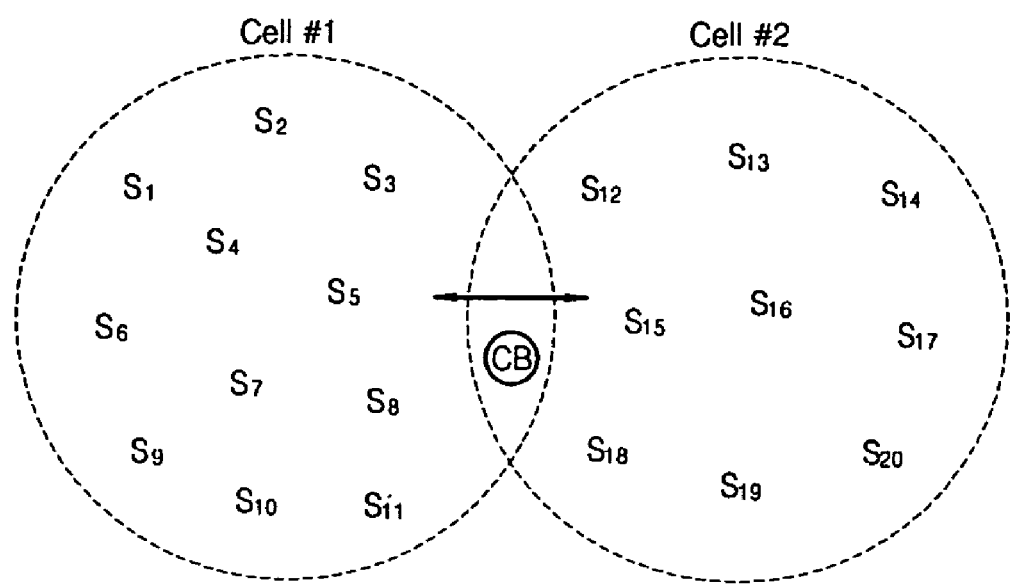
FIG. 1 illustrates two power line communication (PLC) cells connected by a cell bridge (CB), according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 illustrates two power line communication (PLC) cells, Cell #1 and Cell #2, connected by a cell bridge (CB). In PLC technology, there is a PLC transmission unit (PTU) in each home. The term "home" refers to a residence or dwelling, such as a house, an apartment, a condominium, a townhouse, a town home, and the like, or any building with office rooms, where power line communication cells may be located. Each PTU belongs to at least one PLC cell. Each PLC cell has a unique group ID (GID). Different cells are divided logically, but are not necessarily separated physically. In other words, two cells may exist in an identical physical space and be separated logically. Apparatuses in one cell encrypt data with an encryption key unique to the cell. Even though apparatuses in other cells receive this encrypted data, the apparatuses cannot decrypt the encrypted data unless they have the encryption key. Accordingly, privacy is protected between apparatuses in different cells through the uses of such encryption keys.

A CB (cell bridge) is an apparatus to communicate between different cells. In the embodiment illustrated in FIG. 1, one CB directly connects Cell #1 having one or more apparatuses $S_1$-$S_{11}$ and Cell #2 having one or more apparatuses $S_{12}$-$S_{20}$. However, one cell bridge (CB) may correspond to one cell, and data communication between cells may be performed through two cell bridges corresponding to respective cells.

FIG. 1 illustrates the apparatus $S_7$ that belongs to Cell #1 and transmits data to the apparatus $S_{17}$ that belongs to Cell #2.

An administrator may manually input a unique group ID (GID) and encryption key of Cell #1 and a GID and encryption key of Cell #2 in the CB. This information is stored in a routing table of the CB.

Apparatus $S_7$ encrypts data to be transmitted to $S_{17}$ using the encryption key of Cell 1, and then transmits the encrypted data with the address of the apparatus $S_{17}$ as an address of a reception apparatus to the CB. After receiving the encrypted data, the CB checks the address of the reception apparatus (i.e., checks the address of $S_{17}$).

Since the address of the reception apparatus is the address of apparatus $S_{17}$, the CB determines that the reception apparatus $S_{17}$ belongs to Cell #2. By using the encryption key of cell 1, the CB decrypts the encrypted data, and then re-encrypts the decrypted data using the encryption key of Cell #2. The CB adds the GID and encryption key of Cell #2 to the encrypted data and transmits the data to apparatus $S_{17}$.

The apparatus $S_{17}$ receives the data, and then checks the GID. Since the GID is that of Cell #2, the apparatus $S_{17}$ decrypts the data using the encryption key of Cell #2. By doing so, the apparatus $S_{17}$ can obtain decrypted data.

In the data communication method according to the present embodiment, a protocol between CBs by which CBs can actively manage information on cells is provided.

Using conventional technology, an administrator manually inputs information on cells. A conventional method by which the administrator manually inputs the information on the cells has at least the following problem. Manually inputting information on many apparatuses is complicated and inconvenient. Also, the administrator must know the GIDs and encryption keys of cells in advance. The greater the number of cells to be managed gradually increases a number of jobs to be performed by the administrator. Also, this conventional method can be applied only where a new CB is selected and cells are set, and cannot be applied if a CB is already initialized.

Figure 2:
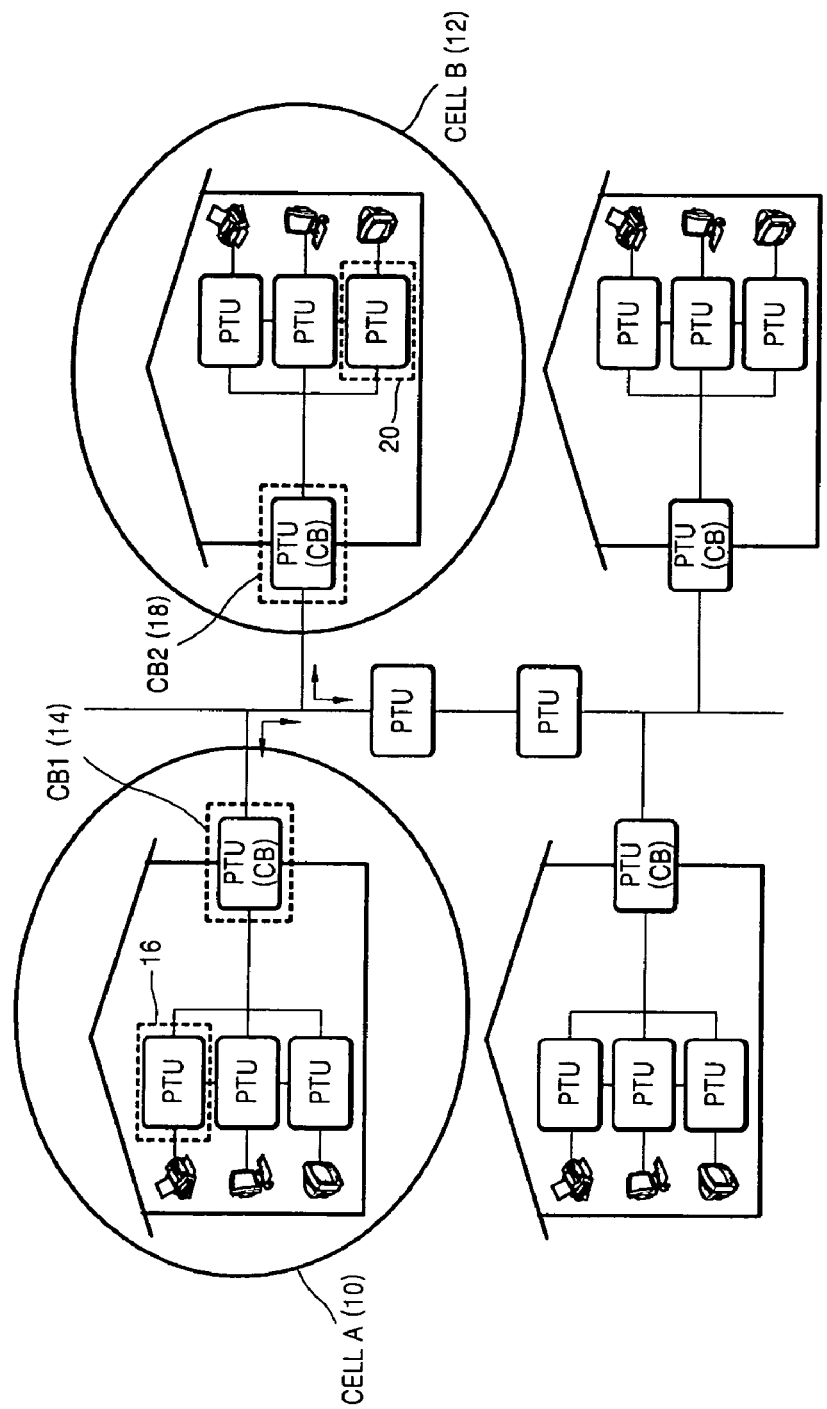
FIG. 2 illustrates an example of a topology of a PLC network to which a data transmission method according to an embodiment of the present general inventive concept is applied.

FIG. 2 illustrates an example of a topology of a PLC network to which a data transmission method according to an embodiment of the present general inventive concept is applied. According to the present embodiment, each of a plurality of CBs corresponds to a different cell. A CB1 14 manages a CELL A 10. A CB2 18 manages a CELL B 12. FIG. 3 illustrates a data transmission method, according to an embodiment of the present general inventive concept. Referring to FIGS. 2 and 3, a data transmission method according to an embodiment of the present general inventive concept will now be explained in detail.

FIG. 3 illustrates a PTU 16 that is an apparatus belonging to CELL A 10 to transmit data to a PTU 20 that is an apparatus belonging to CELL B 12. A PTU can also be referred to as a PLC station. A PLC station to transmit data is referred to as a PLC transmission station and a PLC station to receive data is referred to as a PLC reception station.

Referring to FIG. 3, PLC station B (PTU 20) transmits a station ID (Station ID_B) to CB2 18, which is the CB of CELL B 12, in operation S100.

CB2 18 stores the station ID (Station ID_B) of PLC station B in operation S110. When setting a CB or a PLC station, or registering a PLC station in a cell, each PLC station transmits a corresponding station ID to a CB and the CB stores the information. PLC stations belonging to the same cell have identical GIDs. PLC stations having different GIDs cannot directly perform data communication therebetween.

CB2 18 broadcasts the GID of CELL B 12 to which the CB 2 18 belongs, along with a list of stations belonging to CELL B 12, periodically in operation S120. From a viewpoint of one cell, other cells are referred to as external cells. Transmitting information to many and unspecified external cells is referred to as advertisement. Through advertisement, CBs belonging to other cells receive the information on CELL B 12.

CB 1 14 receives and then stores the information on CELL B 12, that is, the GID and the list of stations belonging to CELL B 12, in operation S130.

Also, CB 2 18 encrypts the encryption key (Enc_key_2) of CELL B 12, to which CB 2 18 belongs, using a secret key, and advertises this encrypted value to external cells in operation S140. CB 1 14 receives and then stores the encrypted value E (Enc_key_2, SECRET key) in operation S150.

Though not illustrated, PLC station A 16 also transmits corresponding station ID to CB 1 14, and CB 1 14 also advertises information on CELL A 10 to external cells. When PLC station A (PTU 16) transmits data to PLC station B (PTU 20), the following operations are performed. PLC station A (PTU 16) transmits a medium access control protocol data unit (MPDU) frame in which only the ID of PLC station B (Station ID_B) is filled to CB 1 14 in operation S160.

CB 1 14 receives the MPDU frame and determines that the destination of the MPDU frame is an external cell by referring to a routing table, and transmits the GID of CELL B2 12 (GID_2) and the encryption key of CELL B 12 that is encrypted by the secret key E (Enc_key_2, SECRET key) in operation S170.

PLC station A (PTU 16) decrypts the encrypted value E (Enc_key_2, SECRET key) with the secret key in operation S180.

Then, PLC station A (PTU 16) transmits MPDU data frame (D.F), including station ID of PLC station B (Station ID_B), GID of cell B (GID_2), and data encrypted with the encryption key of cell B E (Data, Enc_key_2), to CB 1 14 in operation S190.

CB 1 14 transmits the received MPDU data frame (D.F) to CB 2 18 in operation S200. CB 2 18 transmits the received MPDU data frame (D.F) to PLC station B 20 in operation S210. By decrypting the encrypted data with the encryption key of CELL B 12, PLC station B 20 can obtain the data transmitted by PLC station A 16 in operation S220.

If a data transmission method according to embodiments of the present general inventive concept is used to communicate between different cells, information about a cell, such as a GID and an encryption key, is processed automatically using software. Accordingly, an administrator does not need to manually input information, and a CB can actively process the information such that a user can perform communication between cells more conveniently.

The present general inventive concept can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A power line communication (PLC) data transmission method to transmit data from a PLC transmission station of a first cell to a PLC reception station of a second cell, the method comprising:
   receiving a group identification of the second cell and a list of station IDs of stations belonging to the second cell from a cell bridge of the second cell;
   storing the received group identification of the second cell and the list of the station IDs of the stations belonging to the second cell;
   transmitting a station ID of the PLC reception station to a cell bridge of the first cell;
   receiving the group identification and an encryption key of the second cell from the cell bridge of the first cell;
   encrypting data to be transmitted to the second cell using the encryption key of the second cell; and
   transmitting the station ID of the PLC reception station, the group identification of the second cell, and the encrypted data to the cell bridge of the first cell.

2. The method of claim 1, wherein the encryption key of the second cell is encrypted with a secret key.

3. The method of claim 2, further comprising:
   decrypting the encryption key, which is encrypted with the secret key.

4. The method of claim 1, further comprising:
   transmitting a station ID of the PLC transmission station to the cell bridge of the first cell.

5. A method of transmitting data from a first cell bridge of a first power line communication (PLC) cell, the method comprising:
   receiving a group identification of a second power line communication cell and a list of station IDs of stations belonging to the second power line communication cell from a second cell bridge of the second cell;
   storing the received group identification of the second power line communication cell and the list of the station IDs of the stations belonging to the second power line communication cell;

receiving a station ID of a PLC reception station belonging to the second power line communication cell from a PLC transmission station of the first cell including the first cell bridge;

transmitting the group identification and an encryption key of the second cell to the PLC transmission station of the first cell;

receiving the station ID of the PLC reception station, the group identification of the second cell, and data encrypted using the encryption key of the second cell from the PLC transmission station; and transmitting the station ID of the PLC reception station, the group identification of the second cell, and the encrypted data to the second cell bridge of the second cell.

6. The method of claim 5, wherein the encryption key of the second cell is encrypted with a secret key.

7. The method of claim 5, further comprising:
receiving a station ID from the PLC station of the first cell;
storing the station ID received from the first cell; and
transmitting a group identification of the first cell and a list of stored station IDs of the first cell to external power line communication cells.

8. The method of claim 5, wherein the second power line communication cell is an external power line communication cell.

9. The method of claim 5, wherein each of the first and second cell bridges is disposed inside a cabinet panel connecting an internal power line of a home and an external power line.

10. A power line communication (PLC) data transmission apparatus to transmit data from a PLC transmission station of a first cell to a PLC reception station of a second cell, the apparatus comprising:
an external cell information reception unit to receive a group identification of the second cell and a list of station IDs of stations belonging to the second cell from a cell bridge of the second cell;
an external cell information storage unit to store the received group identification of the second cell and the list of the station IDs of the stations belonging to the second cell;
a reception station ID transmission unit to transmit a station ID of the PLC reception station to a cell bridge of the first cell including the PLC transmission station;
a reception cell information reception unit to receive the group identification and an encryption key of the second cell from the cell bridge of the first cell;
a data encryption unit to encrypt data to be transmitted to the second cell using the encryption key of the second cell; and
a data transmission unit to transmit the station ID of the PLC reception station, the group identification of the second cell, and the encrypted data to the cell bridge of the first cell.

11. The apparatus of claim 10, wherein the encryption key of the second cell is encrypted with a secret key.

12. The apparatus of claim 11, further comprising:
an encryption key decryption unit to decrypt the encryption key, which is encrypted with the secret key.

13. The apparatus of claim 10, further comprising:
a transmission station ID transmission unit to transmit a station ID of the PLC transmission station to the cell bridge of the first cell.

14. An apparatus to transmit data from a first power line communication (PLC) cell bridge, the apparatus comprising:
an external cell information reception unit to receive a group identification of a second power line communication cell and a list of station IDs of stations belonging to the second cell from a second power line communication cell bridge of the second cell;
an external cell information storage unit to store the received group identification of the second cell and the list of the station IDs of the stations belonging to the second cell;
a reception station ID reception unit to receive a station ID of a PLC reception station belonging to the second power line communication cell from a PLC transmission station of a first power line communication cell including the first cell bridge;
a reception cell information transmission unit to transmit the group identification and an encryption key of the second cell to the PLC transmission station;
a data reception unit to receive the station ID of the PLC reception station, the group identification of the second cell, and data encrypted using the encryption key of the second cell from the PLC transmission station; and
a data transmission unit to transmit the station ID of the PLC reception station, the group identification of the second cell, and the encrypted data to the second power line communication cell bridge of the second cell.

15. The apparatus of claim 14, wherein the encryption key of the second cell is encrypted with a secret key.

16. The apparatus of claim 14, further comprising:
a station ID reception unit to receive a station ID from the PLC station of the first cell to which the first power line communication cell bridge belongs;
a station ID storage unit to store the station ID; and
a cell information transmission unit to transmit the group identification of the first cell and a list of stored station IDs to external power line communication cells.

17. The apparatus of claim 14, wherein the second power line communication cell is an external power line communication cell.

18. The apparatus of claim 14, wherein each of the first and second power line communication cell bridges is disposed inside a cabinet panel connecting an internal power line of a home and an external power line.

19. A non-transitory computer readable recording medium having embodied thereon a computer program to execute a method, the method comprising:
receiving a group identification of a second power line communication cell and a list of station IDs of stations belonging to the second power line communication (PLC) cell from a cell bridge of the second cell;
storing the received group identification of the second power line communication cell and the list of the station IDs of the stations belonging to the second power line communication cell;
transmitting a station ID of a PLC reception station belonging to the second power line communication cell to a first power line communication cell bridge of a first power line communication cell including a PLC transmission station;
receiving the group identification and an encryption key of the second cell, from the first cell bridge;
encrypting data to be transmitted using the encryption key of the second cell; and
transmitting the station ID of the PLC reception station, the group identification of the second cell, and the encrypted data to the first cell bridge.

20. A non-transitory computer readable recording medium having embodied thereon a computer program to execute a method, the method comprising:
- receiving a group identification of a second power line communication (PLC) cell and a list of station IDs of stations belonging to the second power line communication cell from a second power line communication cell bridge of the second cell;
- storing the received group identification of the second power line communication cell and the list of the station IDs of the stations belonging to the second power line communication cell;
- receiving a station ID of a PLC reception station belonging to the second power line communication cell from a PLC transmission station of a first power line communication cell to which a first power line communication cell bridge belongs;
- transmitting the group identification and an encryption key of the second cell to the PLC transmission station;
- receiving the station ID of the PLC reception station, the group identification of the second cell, and data encrypted using the encryption key of the second cell from the PLC transmission station; and
- transmitting the station ID of the PLC reception station, the group identification of the second cell, and the encrypted data, to the second power line communication cell bridge of the second cell.

21. A method to automatically communicate between cells of a power line communication (PLC) transmission system including a first cell having a first cell bridge and a first PLC station and a second cell having a second cell bridge and a second PLC station, the method comprising:
- transmitting a group identification of the second cell and a list of station IDs of stations belonging to the second cell from the second cell bridge to the first cell bridge;
- storing the received group identification of the second cell and the list of the station IDs of the stations belonging to the second cell at the first cell bridge;
- transmitting a medium access control protocol data unit frame including a station ID of the second PLC station from the first PLC station to the first cell bridge;
- transmitting the group identification and an encryption key of the second cell from the first cell bridge to the first PLC station;
- transmitting a medium access control protocol data unit data frame including the station ID of the second PLC station, the group identification of the second cell, and data encrypted with the encryption key of the second cell from the first PLC station to the first cell bridge;
- transmitting the received medium access control protocol data unit data frame from the first cell bridge through the second cell bridge to the second PLC station; and
- decrypting the encrypted data received at the second PLC station using the encryption key of the second cell to obtain the data transmitted by the first PLC station.

* * * * *